US009595073B1

United States Patent
Ding et al.

(10) Patent No.: US 9,595,073 B1
(45) Date of Patent: Mar. 14, 2017

(54) ENTITY LOCATION MANAGEMENT USING VEHICLE LOGISTICS INFORMATION

(71) Applicant: International Business Machines Corporation, Armonk, NY (US)

(72) Inventors: Hong Wei Ding, Beijing (CN); Hong Bo Li, Beijing (CN); Ganggang Niu, Beijing (CN); Baohua Wang, Beijing (CN); Yong Qing Xue, Beijing (CN); Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/070,298

(22) Filed: Mar. 15, 2016

Related U.S. Application Data

(63) Continuation of application No. 14/925,392, filed on Oct. 28, 2015.

(51) Int. Cl.
  G06Q 50/28     (2012.01)
  G06Q 10/08     (2012.01)
  G08G 1/00      (2006.01)

(52) U.S. Cl.
  CPC ......... *G06Q 50/28* (2013.01); *G06Q 10/0835* (2013.01); *G06Q 10/0838* (2013.01); *G08G 1/20* (2013.01)

(58) Field of Classification Search
  CPC ........... G06Q 10/0833; G06Q 10/0838; G06Q 50/28; G08G 1/20
  USPC .......... 235/385; 701/469, 484, 491; 705/406
  See application file for complete search history.

(56) References Cited

U.S. PATENT DOCUMENTS

| | | | | |
|---|---|---|---|---|
| 6,381,537 B1* | 4/2002 | Chenault | ............. | G01C 21/32 |
| | | | | 340/990 |
| 6,640,187 B1* | 10/2003 | Chenault | ............. | G01C 21/32 |
| | | | | 340/988 |
| 6,990,409 B2 | 1/2006 | Khan et al. | | |
| 7,840,340 B2 | 11/2010 | Graham et al. | | |
| 7,970,538 B2 | 6/2011 | Miyagi | | |
| 2005/0004754 A1* | 1/2005 | Hayes | ............. | G01C 21/30 |
| | | | | 701/533 |
| 2010/0228477 A1* | 9/2010 | Sakashita | ............. | G01C 21/32 |
| | | | | 701/533 |
| 2013/0339076 A1 | 12/2013 | Baranda | | |
| 2014/0279649 A1 | 9/2014 | Angelillo et al. | | |

(Continued)

FOREIGN PATENT DOCUMENTS

JP          2015510637 A       4/2015

OTHER PUBLICATIONS

Oliveira et al., "An intelligent model for logistics management based on geofencing algorithms and RFID technology", Expert Systems with Applications, Apr. 10, 2015, pp. 1-16, Elsevier.

(Continued)

*Primary Examiner* — Thomas G Black
*Assistant Examiner* — Peter D Nolan
(74) *Attorney, Agent, or Firm* — Stephen R. Yoder

(57) ABSTRACT

Physical location information for a specified user is corrected according to vehicle location and trajectory analysis. Vehicles, such as delivery vehicles, produce physical location information for the vehicle during delivery events to the specified user and a surrounding physical area. The physical location information for the vehicle is accessed to correct erroneous physical location information for the specified user.

1 Claim, 3 Drawing Sheets

(56) References Cited

U.S. PATENT DOCUMENTS

| | | |
|---|---|---|
| 2015/0006429 A1 | 1/2015 | Staples |
| 2016/0224931 A1* | 8/2016 | Shah .................... G06Q 10/083 |
| 2016/0224936 A1* | 8/2016 | Shah .................... G06Q 10/083 |
| 2016/0224937 A1* | 8/2016 | Shah .................... G06Q 10/083 |
| 2016/0224938 A1* | 8/2016 | Shah .................... G06Q 10/083 |

OTHER PUBLICATIONS

Sivamani et al, "A Study on Intelligent User-Centric Logistics Service Model Using Ontology", Jounal of Applied Mathematics, Jun. 19, 2014, pp. 1-0, vol. 2014, Acticle ID 162838, Hindawi Publishing Corporation.

U.S. Appl. No. 14/925,392, Entitled "Entity Location Management Using Vehicle Logistics Information", filed Oct. 28, 2015.

Appendix P.: List of IBM Patents or Patent Applications to be Treated as Related, 2 pages.

\* cited by examiner

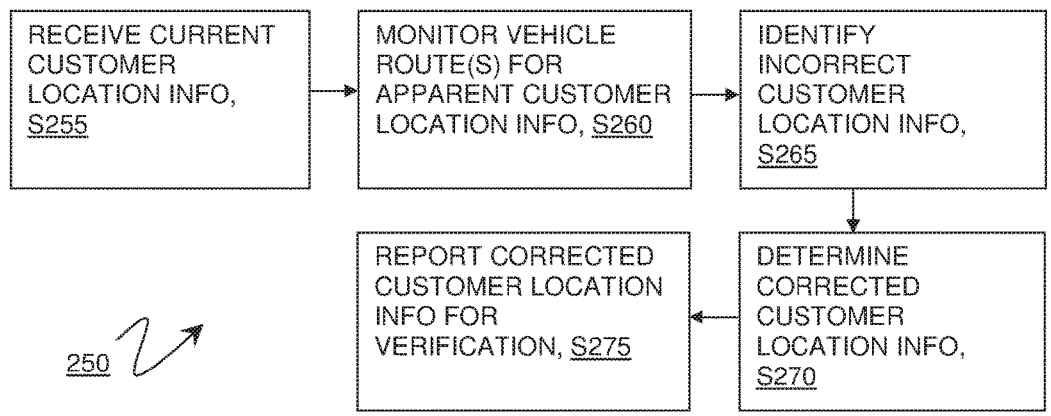
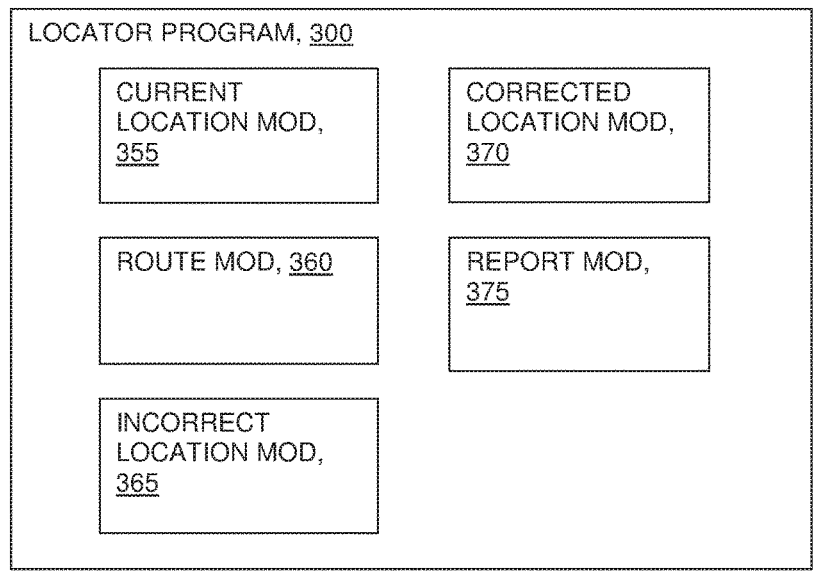
Fig. 2
Fig. 3

ENTITY LOCATION MANAGEMENT USING VEHICLE LOGISTICS INFORMATION

BACKGROUND

The present invention relates generally to the field of geo-location, and more particularly to data accuracy.

A third-party logistics provider (abbreviated 3PL, or sometimes TPL) is a firm that provides service to its customers with outsourced logistics services for supply chain management functions. In both production and 3PL enterprises, strategic planning (e.g., facility location) and operational planning (e.g., delivery process) depend on precise customer location information.

Imprecise customer location information effects the delivery sequence and the total cost computation for 3PL performance. It is known to contact each customer prior to delivery to seek customer location information; however, even the customer will not always provide the precise location information needed to efficiently deliver goods to the customer.

SUMMARY

In one aspect of the present invention, a method, a computer program product, and a system includes: identifying a first location data set including a first proposed physical location of a first entity, receiving a set of vehicle location data including a set of vehicle locations over time generated during traversal of a service route that includes a first service stop at a first known physical location of the first entity, analyzing the set of vehicle location data to determine a vehicle location during the service stop, determining a deviation value based, at least in part, on a variation between the first proposed physical location of the first entity and the vehicle location during the service stop, responsive to the deviation value exceeding a threshold deviation value, designating the first location data set as an incorrect location data set, and reporting the incorrect location data set for a corrective action.

BRIEF DESCRIPTION OF THE SEVERAL VIEWS OF THE DRAWINGS

FIG. 2 is a flowchart showing a first embodiment method performed, at least in part, by the first embodiment system;

FIG. 3 is a schematic view of a machine logic (for example, software) portion of the first embodiment system.

DETAILED DESCRIPTION

Figure 1:
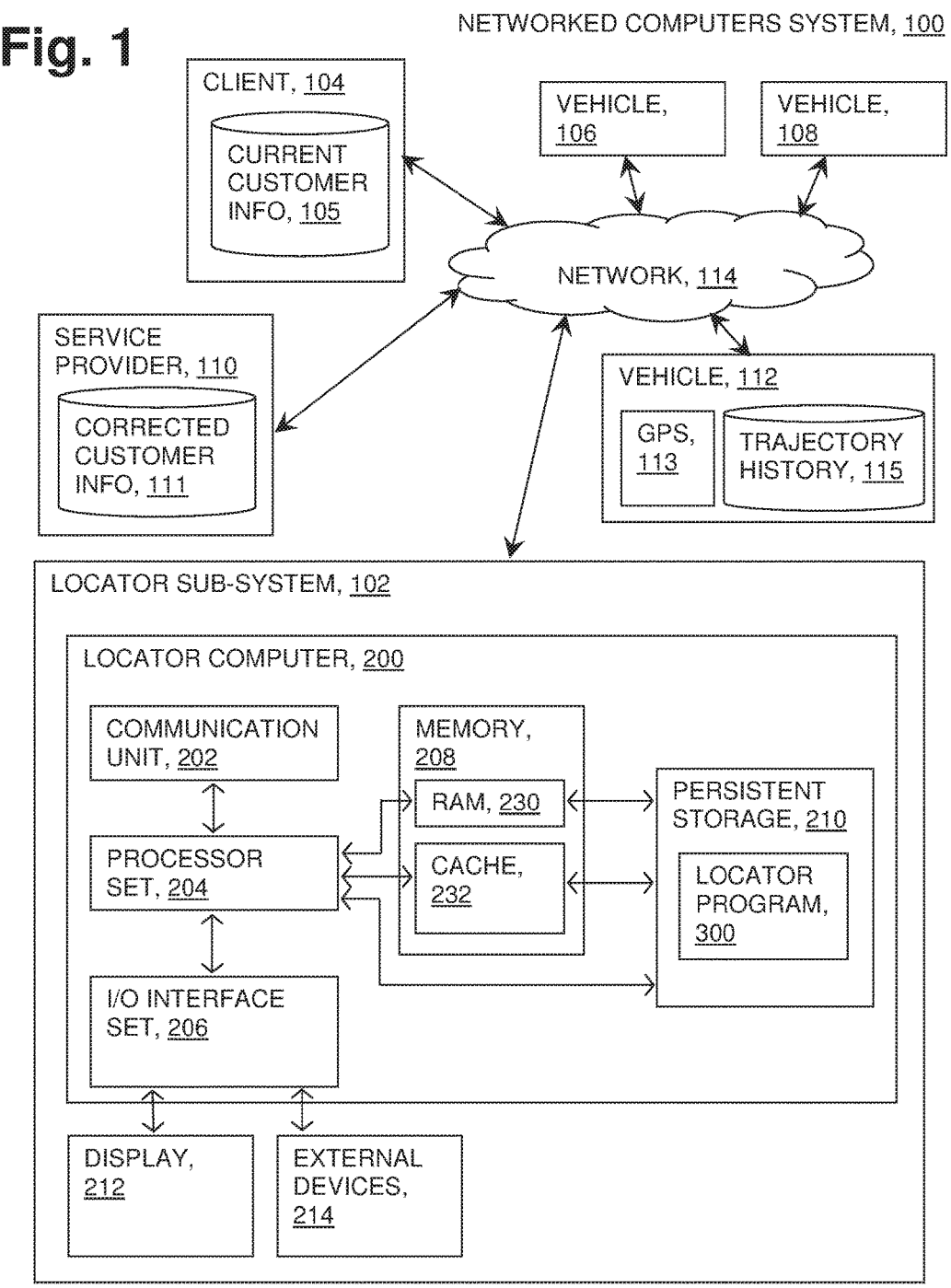
FIG. 1 is a schematic view of a first embodiment of a system according to the present invention.

Physical location information for a specified user is corrected according to vehicle location and trajectory analysis. Vehicles, such as delivery vehicles, produce physical location information for the vehicle during delivery events to the specified user and a surrounding physical area. The physical location information for the vehicle is accessed to correct erroneous physical location information for the specified user. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: locator sub-system 102; client sub-system 104; current customer location information store 105; service provider sub-system 110; corrected customer location information store 111; vehicle sub-systems 106, 108, and 112; global positioning system (GPS) 113; vehicle trajectory history store 115; communication network 114; locator computer 200; communication unit 202; processor set 204; input/output (I/O) interface set 206; memory device 208; persistent storage device 210; display device 212; external device set 214; random access memory (RAM) devices 230; cache memory device 232; and locator program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Locator program 300 operates to improve a set of customer location information by monitoring third party logistics vehicle locations (for example, via GPS 113) and corresponding vehicle trajectories when approaching a specified customer location as part of a route, such as for delivering goods. The vehicle location information data set is processed with available customer location information to determine whether or not the available customer location information is correct according to a threshold value representing deviation between the two locations. Where available customer location information deemed to be incorrect, a correction process follows, which results in a correction report. Some embodiments of the locator program automatically correct the available customer location information according to the correction report.

Available customer location information refers to information available to the user for locating a particular customer, or set of customers. The information may be provided by a client on behalf of the customer or by the customer itself. Further, the location information may be obtained by access to the Internet, business phone directory, promotional flyer, and other publicly and/or privately available sources.

Some embodiments of the present invention recognize the following facts, potential problems and/or potential areas for improvement with respect to the current state of the art: (i) oftentimes, a production enterprise, using 3PL to deliver its products to customers can only provide customer locations with incomplete or incorrect information; (ii) enterprises are not committed to confirm the location information for customers; (iii) failure of the enterprise to provide precise customer location information leads to project delays and other inconveniences for the customers; and/or (iv) logistics vehicle trajectories can reflect the exact locations of customers.

Some embodiments of the present invention leverage a large volume of historical vehicle trajectory data (shown, for example, as trajectory history 115) generated by delivery vehicles regularly approaching the precise location of the customer. Some embodiments of the present invention find patterns during delivery of goods according to vehicle trajectories and the customer location information data set(s) provided by clients, such as from current customer location information store 105 located at client 104.

Some embodiments of the present invention obtain delivery sequence information for various customers during the delivery process performed by various vehicles, such as vehicles 106, 108, and 112. The delivery sequence information is stored as historic location information (see trajectory history 115). The set sequence information may be referred to as a sequence data set.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where current location module ("mod") 355 receives current customer location information. It should be noted that the term "current" customer location information is to be distinguished from "available" customer location information in that the current information may be modified or otherwise updated according to some level of analytics such that the nature of the information is not necessarily the same as available customer location information. In this example, current customer location information 105 is received when service provider 110 receives from client 104 an order for delivery of goods. The service provider is a subscriber of a locator service that practices an example embodiment of the present invention via locator sub-system 102 operating locator program 300. Alternatively, the service provider practices an embodiment of the present invention and the customer location information is received by the current location mod directly from the customer when the order is placed.

Processing proceeds to step S260, where route mod 360 monitors vehicle route(s) for apparent customer location information. In this example, the route mod monitors the location of vehicle 112 as reported by GPS 113 while the vehicle traverses a delivery route that includes a delivery to client 104. In this example, events monitored by the route mod are stored in trajectory history 115. Alternatively, location information related to the vehicle is obtained by other positioning techniques now known or to be known in the future.

Processing proceeds to step S265, where incorrect location mod 365 identifies incorrect customer location information. As discussed herein, incorrect location information often exists in available customer location information, which prevents services from effectively planning routes. In this example, the trajectory history provides both location and trajectory paths for each vehicle. By analyzing the trajectory from where the vehicle came as it approached the customer location in question as well as the location where the vehicle stopped, or otherwise indicated arrival at the physical customer location, the incorrect location module identifies discrepancies, or deviations, from the expected route and/or stop. The expected route being the route according to the available customer location information. In this example, the customer locations are closely located with other locations, so the amount of deviation to trigger an incorrect location event is 30 feet. The allowable deviation value will vary in both units and distance according to the region where it is applied and/or the user preference/policy. When an incorrect location event is triggered, the corresponding customer location is tagged as being "incorrect." In some embodiments of the present invention, the action of tagging a customer location as incorrect drives an immediate response of working out a correction. Alternatively, those locations tagged as incorrect are collected over time and addressed periodically or when a particular number of tags are generated.

Processing proceeds to step S270, where corrected location mod 370, determines corrected customer location information. In this example, determining the corrected location information relies on both trajectory information and position information stored in trajectory history 115 (FIG. 1). In addition to working with the trajectory history store, other sets of location information that are considered to be correct are used to establish a confidence level for the trajectory store associated with any given vehicle from which the trajectory and position information was taken. In this example, the confidence level is one of 0.0, 0.5, and 1.0. A confidence of 1.0 is the highest and indicates a strong repeatable correlation between vehicle trajectory data and service stops at correctly identified customer locations. By reviewing reliable vehicle location data corresponding to a known good location, the location data from the same vehicle at incorrect locations, a range of possible actual locations can be determined. Additional vehicle data and/or stop data at a location tagged as being incorrect as to the location information is useful in narrowing down the location of the customer in question. Further discussion of determining correct location information is found below with respect to FIG. 4.

Processing ends at step S275, where report mod 375 reports corrected customer location information for verification. In this example, prior to replacing incorrect customer location information with corrected customer location information, the corrected information is verified by a verification process. The verification process will vary according to available resources, individual preferences, and even corporate policy. However, in this example, the verification process involves storing the corrected information in corrected customer information store 111 (FIG. 1). When a next approach to a corrected customer location will be made by a vehicle, the corrected customer location information will be used as a reference to determine whether or not the actual location of the vehicle corresponds with the corrected location information for the customer. If the locations match within a pre-determined distance, the corrected location information is verified. Alternatively, vehicle trajectory data is collected over a period of time. When the collection period ends, the corrected location information for one or more customers is processed in view of the new trajectory data. If no incorrect tags are applied during analysis, the set of corrected customer location information is verified. Alternatively, a pre-determined number of stops at a corrected customer location is required before validation is complete.

While the process in FIG. 2 ends at the above step, upon verification, the current customer location information may be automatically corrected according to an agreement between the service provided and the client. Alternatively, automatic correction may be performed by the service provided to a set of customer location information stored for use in future location information analysis (not shown).

Further embodiments of the present invention are discussed in the paragraphs that follow and later with reference to FIG. 4.

Some embodiments of the present invention are directed to a process that includes: using map-matching techniques on raw GPS data from logistics vehicles during the delivery process to obtain the vehicle trajectories; using vehicle routing optimization techniques to label those customers having potentially incorrect location information; comparing logistics vehicle trajectories for trajectory dissimilarity to understand the specific delivery sequence for two customers; gradually updating the available customer location information according to the specific delivery sequences; and verifying the resulting customer location information.

In this example process, the input may include, for example: (i) raw GPS data of logistics vehicles; (ii) visiting customer list of each vehicle, but without delivery sequence due to poorly designed ERP; (iii) hard copies of delivery information (most of the delivery information is not stored in a database); (iv) raw customer location information, part of the data included in the information may be incorrect.

Representative output of this example process may include, for example: (i) updated customer location information, defined by a set of road segments on a GIS map.

Figure 4:
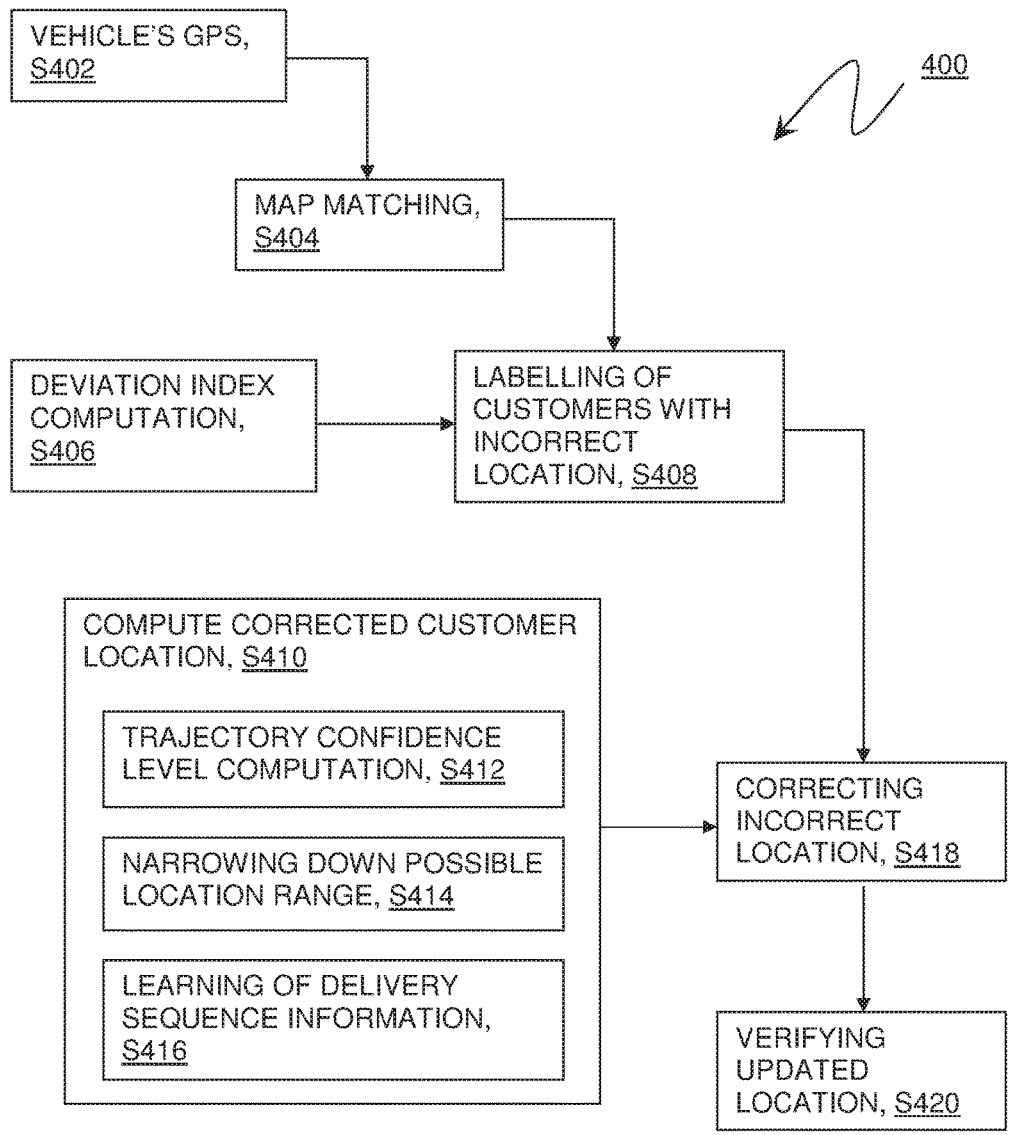
FIG. 4 is a flowchart of a second embodiment of a method according to the present invention.

FIG. 4 shows flowchart 400 depicting a second method for correcting a set of incorrect customer location information according to an embodiment of the present invention. This method will now be discussed, over the course of the following paragraphs, with extensive reference to FIG. 4 (for the method step blocks).

Processing begins at step S402, where the GPS of a vehicle records location data, which is stored as a historic record of vehicle trajectories.

Processing proceeds to step S404, where a map is generated that displays the location of a customer according to the available customer location information.

Processing proceeds to step S406, where a deviation index is calculated with respect to the mapped customer location(s) and the corresponding vehicle trajectories stored in the historic record. Incorrect customer location information is identified with reference to the deviation index. Some embodiments of the present invention operate according to a threshold deviation index value to identify which available customer location information is sufficiently incorrect to prompt a corrective action.

Processing proceeds to step S408, where incorrect customer locations are labelled according to a deviation index computed in step S406. As stated above, the determination that available customer location information is incorrect may be based on any number of preference-based thresholds and/or other comparative criteria. In some embodiments of the present invention, when available customer location information meets a threshold for being considered incorrect, the customer location is labelled a "high risk customer."

One example process for determining a "high risk customer" follows. First, compare the vehicle trajectory with raw data of customer location. Next, for each customer location that deviates from the vehicle trajectory more than a given threshold, record a value, such as a whole number or fraction, to denote the degree to which the customer location deviates from historical vehicle trajectories (e.g., just use a counter to count the number of vehicles that do not pass the customer). Then, label the possible customers with "incorrect location" based on the given criteria. Finally, rank the labelled customers according to their corresponding recorded value.

Processing proceeds to step S410, where corrected customer location information is computed. In this example, the computation includes three sub-steps. Sub-step S412 computes the vehicle trajectory confidence level. In that way, the recorded vehicle trajectory, as stored in the historic record, is validated against secondary data including, for example, daily route assignments, delivery schedule, and other indicators of what the vehicle trajectory might have been.

Sub-step S414 computes the possible location of the customer by narrowing down the customer location range based on received data, such as available customer location information. Finally, in this example, sub-step S416 analyzes the vehicle trajectory data to determine a set of delivery sequence information. or delivery sequence data set. In this example, the set of delivery sequence information is derived in part by taking into account the direction from which the vehicle approaches the customer location range, computed in sub-step S414.

One example process for computing corrected customer location information follows. First, select the customer location associated with the highest rank. Second, identify the vehicle trajectories that deliver to, or otherwise approach, the customer to compute their individual confidence levels and relative dissimilarities among the set of trajectories. Third, for pair of trajectories, locate their intersection, or overlapping portion(s), to decrease the possible road segment set. Finally, use the GPS interval and the size of shipment to further decrease the possible road segment set. For each customer location, collect the corresponding confidence level of all trajectories. Note that the confidence level, in this example, is the number of customer locations labelled as an "incorrect location" divided by the total number of customer locations in the given vehicle trajectory. If one of the customer locations has already been updated, its location may be multiplied with an index that is less than 1. For a pair of trajectories for a customer location, compute a corresponding dissimilarity. Note that the dissimilarity, in this example, is the number of customer locations in both trajectories divided by the total number of distinct customer locations in the pair of trajectories.

Some embodiments of the present invention address a scenario where each of the customer locations in a particular set of customer locations is incorrect. Where that scenario arises, one approach is to select a customer location that is associated with the most vehicle trajectories having relatively high confidence levels. In that way, the "best" information is identified and forms the basis of correcting the other incorrect customer locations.

Processing proceeds to step S418, where the available customer location information is updated to create corrected customer location information. In this example corrected customer location information is stored in a customer information store as available customer location information. Alternatively, corrected customer location information is stored separately from unprocessed available customer location information. In that way, routine maintenance of available customer location information is performed without destroying the corrected customer location information, which may be considered superior to any generally available customer location information.

Processing ends at step S420, where corrected customer location information is verified as being precise and accurate. In this example, where corrected customer location information is stored along with other available customer location information, an update record is maintained for verification of the corrected data. When vehicle trajectories indicate that a vehicle has approached a customer location associated with updated, or corrected, data, the customer location is verified against the historic record. Alternatively, corrected customer location information is first stored in temporary storage until a matching vehicle trajectory can verify the actual customer location against the corrected data. Upon verification, the corrected customer location information is stored either as available customer location information or as verified customer location information, depending on user preference or, perhaps, corporate policy.

Some embodiments of the present invention use vehicle routing optimization to verify the corrected customer location information. For example, for each candidate position of a "high-risk customer," the process is as follows. First, locate the first candidate position, then find vehicle trajectories that deliver to, or otherwise approach, the actual customer location. Using a process of "vehicle routing optimization," obtain the "best" route for delivery to the actual customer location. Finally, compare the "best" route with a vehicle trajectory corresponding to the customer location to generate a rating for the candidate position.

Some embodiments of the present invention are directed to a method of automatically correcting available customer location information based on the trajectories of logistics vehicles. An example process includes the following steps: (i) matching the GPS to road segments; (ii) labelling the possible customers with incorrect location; (iii) correcting the available customer location information based on confidence level(s) of vehicle trajectories while continuously learning from the delivery sequence(s) generated during delivery events; and (iv) verifying corrected customer location information.

Some embodiments of the present invention employ one or more apparatus in the following list: (i) map matcher; (ii) customer location labeler; (iii) customer location corrector based on trajectory and delivery sequence; and (iv) customer location verifier.

Some embodiments of the present invention may include one, or more, of the following features, characteristics and/or advantages: (i) tracks the nature of the physical stress subjected to component hardware; (ii) tracks the overall usage of a hardware component from date of manufacture; (iii) tracks the types of environments and/or conditions in which a hardware component is used; (iv) a mechanism to detect the physical stress, usage instances, and/or activities and conditions that affect the lifetime, fatigue and performance of the hardware component; (v) reduces unnecessary expenditure incurred in premature hardware replacements due to faulty analysis; (vi) simplifies service planning; and/or (vii) reduces outages in data centers of ever increasing size.

Some embodiments of the present invention may include one, or more, of the following features, characteristics and/or advantages: (i) leverages GPS data of logistics vehicles used by 3PL providers to precisely determine customer location information; and/or (ii) applies vehicle routing information to identify potentially incorrect customer location information.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Service vehicle: any vehicle, motorized or otherwise, that is used to traverse a route that includes at least one service stop. Examples of service vehicles include delivery vehicles, mail carrier vehicles, maintenance vehicles, and medical services vehicles.

Service stop: any location within a vehicle route where services are rendered by at least pausing the movement of the vehicle so that services may be provided. Examples of service stops include mail delivery stops where the mail carrier vehicle briefly pauses are a mailbox to deliver mail, delivery stops where goods are delivered to a physical location, and medical services stops where, for example, home nursing services are provided at a location(s) according to a specified route. The duration required for a service stop may be defined by the technology of the location tracking service(s), which is to recognize the service stop at an identifiable location.

What is claimed is:

1. A method for improving strategic and operational planning by maintaining an updated customer location database, the method comprising:

identifying a location data set including a proposed physical location of a first entity;

receiving a set of vehicle location data from a plurality of GPS-monitored service vehicles generated during traversal of a plurality of service routes including one or more road segments, each service route including a service stop at a known physical location of the first entity;

for each service vehicle of the plurality of GPS-monitored service vehicles, assigning a confidence level based at least in part on a set of vehicle locations during the service stop, the confidence level corresponding to a degree to which the set of vehicle locations are at a same location;

analyzing a sub-set of vehicle location data corresponding to a set of service vehicles assigned a threshold confidence level to determine an apparent customer location;

determining a deviation value based, at least in part, on a variation between the proposed physical location and the apparent customer location;

responsive to the deviation value exceeding a threshold deviation value, designating the location data set as an incorrect location data set;

generating a corrected location data set based, at least in part, on the incorrect location data set and the apparent customer location; and verifying the corrected location data set as being accurate by a new variation between the corrected location data set and a new vehicle location received from a vehicle assigned a threshold confidence level at the service stop not exceeding the threshold deviation value;

wherein:

the threshold deviation value is an allowable service stop variation according to a proximity of neighboring entities.

* * * * *